(12) United States Patent
Tanida

(10) Patent No.: US 8,135,632 B2
(45) Date of Patent: Mar. 13, 2012

(54) DEVICE ADMINISTRATION SYSTEM THAT ADMINISTERS DEVICE USE STATUS FOR EACH ADMINISTRATIVE UNIT, ADMINISTRATION INFORMATION CHANGE PROGRAM, CHARGE INFORMATION PROCESSING PROGRAM AND CHARGE INFORMATION PROCESSING METHOD

(75) Inventor: Mio Tanida, Hiratsuka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 949 days.

(21) Appl. No.: 11/011,138

(22) Filed: Dec. 15, 2004

(65) Prior Publication Data

US 2006/0048231 A1 Mar. 2, 2006

(30) Foreign Application Priority Data

Aug. 30, 2004 (JP) ................................. 2004-250590

(51) Int. Cl.
*G07B 17/00* (2006.01)
*G07F 19/00* (2006.01)
*G06F 3/12* (2006.01)

(52) U.S. Cl. ........................................ 705/30; 358/1.15
(58) Field of Classification Search .................... 705/30; 358/1.15
See application file for complete search history.

(56) References Cited

U.S. PATENT DOCUMENTS

| | | | | |
|---|---|---|---|---|
| 5,323,393 | A * | 6/1994 | Barrett et al. | 370/449 |
| 5,784,622 | A * | 7/1998 | Kalwitz et al. | 710/200 |
| 6,216,113 | B1 * | 4/2001 | Aikens et al. | 705/34 |
| 6,430,536 | B2 * | 8/2002 | Irving et al. | 705/2 |
| 6,618,566 | B2 * | 9/2003 | Kujirai et al. | 399/79 |
| 6,641,312 | B1 * | 11/2003 | Chang et al. | 400/76 |
| 6,854,839 | B2 * | 2/2005 | Collier et al. | 347/100 |

(Continued)

FOREIGN PATENT DOCUMENTS

JP 2000-163352 6/2000

(Continued)

OTHER PUBLICATIONS

Notification of Grounds for Rejection, issued by the Japanese Patent Office on Mar. 20, 2007, for JP 2004-250590, and English translation thereof.

(Continued)

*Primary Examiner* — Christian LaForgia
(74) *Attorney, Agent, or Firm* — Buchanan Ingersoll & Rooney PC

(57) ABSTRACT

The present invention is to provide a device administration system that prevents discrepancies in the use status information stored in the administration system when administrative units, such as users and/or departments, are excluded as subjects of administration, as well as an administration information change program to change the administration information in such administration system, a charge information processing program and a charge information processing method. This object is attained by providing a device administration system comprising: a device; an administration device that administers usage status information of the device for each administrative unit that is a user and/or a organization; and an administration information change device that changes the administrative unit; wherein in a case where the administration information change device excludes one of the administrative unit, the administration information change device makes changes so that the usage status information related to the administrative unit excluded by the administration information change device is not deleted from the administration device and is treated as a usage status information related to a different administrative unit.

11 Claims, 4 Drawing Sheets

U.S. PATENT DOCUMENTS

| | | | |
|---|---|---|---|
| 6,952,680 B1* | 10/2005 | Melby et al. | 705/28 |
| 7,058,154 B1* | 6/2006 | Stark et al. | 376/260 |
| 7,076,184 B2* | 7/2006 | Zwiefelhofer | 399/79 |
| 7,286,250 B2* | 10/2007 | Kujirai et al. | 358/1.15 |
| 7,315,887 B1* | 1/2008 | Liang et al. | 709/223 |
| 7,362,461 B2* | 4/2008 | Reddy et al. | 358/1.15 |
| 7,398,545 B2* | 7/2008 | Matsuki | 726/2 |
| 7,406,399 B2* | 7/2008 | Furem et al. | 702/182 |
| 7,430,605 B2* | 9/2008 | Quach et al. | 709/229 |
| 7,571,126 B2* | 8/2009 | Nguyen et al. | 705/30 |
| 7,672,880 B2* | 3/2010 | Gava | 705/30 |
| 7,760,382 B2* | 7/2010 | Murata | 358/1.15 |
| 7,882,029 B2* | 2/2011 | White | 705/40 |
| 2003/0065713 A1* | 4/2003 | Quach et al. | 709/203 |
| 2003/0074312 A1* | 4/2003 | White | 705/40 |
| 2003/0191655 A1* | 10/2003 | Janz | 705/1 |
| 2004/0093410 A1* | 5/2004 | Reddy et al. | 709/224 |
| 2004/0215533 A1* | 10/2004 | Doeberl et al. | 705/30 |
| 2004/0249655 A1* | 12/2004 | Doeberl et al. | 705/1 |
| 2005/0097198 A1* | 5/2005 | Getler et al. | 709/223 |
| 2005/0286068 A1* | 12/2005 | Johnson et al. | 358/1.14 |
| 2006/0277407 A1* | 12/2006 | Matsuki | 713/170 |

FOREIGN PATENT DOCUMENTS

JP  2003-216395  7/2003

OTHER PUBLICATIONS

Reference cited in Japanese Patent Office's Notification of Grounds for Rejection for JP 2004-250590, entitled, Dedicated to Instant Administrator! Root Vanity Seminar, Linux magazine, Sep. 1, 2000, pp. 128-151, vol. 2, Issue 9, ASCII Corporation, Japan, and partial English translation.

\* cited by examiner

Fig. 4

| TYPE OF COUNTER | | USER 1 | USER 2 | USER 3 | ... | USER X | DEPARTMENT 1 | DEPARTMENT 2 | DEPARTMENT 3 | ... | DEPARTMENT Y | PUBLIC USER | BOX ADMINISTRATOR |
|---|---|---|---|---|---|---|---|---|---|---|---|---|---|
| TOTAL COUNTER (COPY + FAX + SCANNER) | TOTAL | 123 | 12 | 99 | | 654 | 48 | 33 | 9987 | | 493 | 94 | 30 |
| | FULL COLOR | 234 | 33 | 74 | | 39 | 654 | | 1875 | | 75 | 40 | 40 |
| | MONOCHROME | 345 | 2 | 94 | | 48 | 345 | 74 | 456 | | 35 | 30 | 30 |
| | MONOCOLOR | 234 | 75 | 40 | | 26 | 74 | 94 | 5 | | 74 | 43 | 43 |
| | BICOLOR | 22 | 35 | 30 | | 2 | 93 | 48 | 33 | | 94 | 69 | 69 |
| COPY TOTAL COUNTER | TOTAL | 33 | 74 | 30 | | 4813 | 493 | 30 | 45 | | 40 | 654 | 654 |
| | FULL COLOR | 2 | 94 | 30 | | 833 | 345 | 43 | | | 30 | 345 | 345 |
| | MONOCHROME | 75 | 40 | 40 | | 3234 | 654 | 40 | 40 | | 654 | 74 | 30 |
| | MONOCOLOR | 35 | 30 | 30 | | 345 | 345 | 30 | 30 | | 64 | 345 | 345 |
| | BICOLOR | 74 | 43 | 43 | | 654 | 654 | 43 | 43 | | 4 | 654 | 654 |
| COPY (LARGE SIZE) COUNTER | TOTAL | 94 | 69 | 69 | | 345 | 26 | 69 | 69 | | 78 | 345 | 26 |
| | FULL | 40 | 654 | 654 | | 654 | 22 | 654 | 654 | | 654 | 654 | 22 |
| | MONOCHR | 30 | 345 | 345 | | 457 | 33 | 345 | 345 | | 26 | 69 | 69 |
| | MONOCOL | 43 | 74 | 74 | | 654 | 48 | 74 | 74 | | 22 | 654 | 654 |
| | BICOLOR | 69 | 93 | 234 | | 40 | 40 | 93 | 234 | | 93 | 345 | 345 |
| PRINTER TOTAL COUNTER | TOTAL | 345 | 39 | 22 | | 30 | 30 | 39 | 345 | | 48 | 74 | 74 |
| | FULL | 654 | 48 | 33 | | 43 | 43 | 48 | 654 | | 40 | 93 | 234 |
| | MONOCHR | 345 | 26 | 2 | | 69 | 69 | 26 | 345 | | 30 | 39 | 22 |
| | BICOLOR | 654 | 22 | 75 | | 654 | 654 | 22 | 654 | | 43 | 48 | 33 |
| PRINTER (LARGE SIZE) COUNTER | TOTAL | 457 | 33 | 35 | | 345 | 345 | 33 | 69 | | 69 | 26 | 2 |
| | FULL COLOR | 654 | 48 | 33 | | 654 | 654 | 22 | 654 | | 654 | 22 | 75 |
| | MONOCHROME | 36 | 75 | 94 | | 26 | 69 | 69 | 345 | | 345 | 33 | 35 |
| | BICOLOR | 36 | 35 | 40 | | 234 | 26 | 74 | 74 | | 43 | 74 | 74 |
| SCANNER COUNTER | LARGE | 654 | 74 | 30 | | 654 | 48 | 33 | 93 | | 69 | 93 | 234 |
| | SMALL | 345 | 94 | 654 | | 36 | 75 | 94 | 39 | | 345 | 39 | 22 |
| SCANNER/FAX READ COUNTER | | 74 | 40 | 345 | | 36 | 35 | 40 | 48 | | 654 | 48 | 48 |
| SCANNER/FAX (LARGE SIZE) READ COUNTER | | 93 | | 654 | | 654 | 74 | 30 | 26 | | 345 | 26 | 2 |
| SCANNER/FAX PRINT COUNTER | | 39 | | 457 | | 64 | 345 | 345 | 22 | | 654 | 22 | 75 |
| SCANNER/FAX (LARGE SIZE) PRINT COUNTER | | 48 | | 654 | | 4 | 654 | 654 | 33 | | 457 | 93 | 35 |
| FAX TRANSMISSION PAGE COUNTER | | 26 | | 75 | | 78 | 345 | 26 | 74 | | 654 | 48 | 33 |
| PAPER SIZE-SPECIFIC COUNTER | | 2 | | 35 | | 654 | 654 | 22 | 93 | | 36 | 75 | 94 |
| BOTH-SIDE COUNTER | | 4 | | 74 | | 45789 | 457 | 33 | 435 | | 36 | 35 | 40 |
| ORIGINAL PAGE COUNTER | | 833 | 813 | 94 | | 8546 | 654 | 48 | 249 | | 74 | 74 | 654 |
| SHEET COUNTER | | 493 | 493 | 94 | | 65 | | | 852 | | 333 | 234 | 345 |

DEVICE ADMINISTRATION SYSTEM THAT ADMINISTERS DEVICE USE STATUS FOR EACH ADMINISTRATIVE UNIT, ADMINISTRATION INFORMATION CHANGE PROGRAM, CHARGE INFORMATION PROCESSING PROGRAM AND CHARGE INFORMATION PROCESSING METHOD

RELATED APPLICATIONS

This application is based on Application(s) No. 2004-250590, filed in Japan on Aug. 30, 2004, the entire content of which is hereby incorporated by reference.

BACKGROUND OF THE INVENTION

1. Field of the Invention

The present invention relates to a device administration system that administers the device use status for each administrative unit, which comprises a user and/or an organization to which the user belongs, an administration information change program to change the administration information in such administration system, a charge information processing program and a charge information processing method.

2. Description of the Related Art

A device system has been provided that, where an output device such as an MFP (multifunction peripheral or multifunction digital copier) or printer is shared by multiple users, includes an administration device that administers the output device use status (charge information) comprising the number of copies or prints for each administrative unit, which comprises a user or a department to which the user belongs, and that stores the cumulative total of copies or prints for the users and/or departments in the administration device by providing each user or department an authorization code and asking for the authorization code at the time of use (Japanese Patent Laid-Open No. 2000-163352 and Japanese Patent Laid-Open No. 2003-216395, for example).

Such a device system is configured such that a user who does not have an authorization code can also use certain of the device's functions, and the status of use permitted without the authorization process is also stored for administration purposes in the administration device as public administration information.

It is not uncommon, however, with a device described above, that the once-configured settings of administrative units (users and/or departments) must be changed due to an increase or decrease in the number of users or reorganization of the departments.

In such a case, the users and/or departments that have been subjected to administration under the current settings may be eliminated as subjects of administration under the new settings. In that case, the stored use status information for the users and/or departments excluded as subjects of administration is lost.

However, where such user status information is lost, the problem arises that discrepancies occur in the use status information stored in the administration device following configuration of the new settings, leading to a discrepancy in the cumulative total of copies or prints.

OBJECTS AND SUMMARY

The present invention was devised to resolve this problem, and an object thereof is to provide a device administration system that prevents discrepancies in the use status information stored in the administration system when administrative units, such as users and/or departments, are excluded as subjects of administration, as well as an administration information change program to change the administration information in such administration system, a charge information processing program and a charge information processing method.

This object is attained by providing a device administration system comprising: a device; an administration device that administers usage status information of the device for each administrative unit that is a user and/or a organization; and an administration information change device that changes the administrative unit; wherein in a case where the administration information change device excludes one of the administrative unit, the administration information change device makes changes so that the usage status information related to the administrative unit excluded by the administration information change device is not deleted from the administration device and is treated as a usage status information related to a different administrative unit.

Using this construction, because, where administrative units subjected to administration by the administration device are to be excluded from such administration, the administration information change device makes changes such that the usage status information for such administrative units is not deleted from the administration device and is treated as usage status for a different administrative unit, the usage status information for the administrative units to be excluded is not lost from the administration device, and therefore the occurrence of discrepancies in the usage status information can be prevented.

It is preferred that the different administrative unit is a prescribed administrative unit, and the usage status information related to the administrative unit excluded by the administration information is added to the usage status information related to the prescribed administrative unit.

As a result, because the usage status information for the administrative units to be excluded is added to the use status information for the prescribed administrative unit, the use status information for the administrative units to be excluded becomes reflected in the sum, such that the occurrence of discrepancies in the use status information can be prevented.

It is further preferred that the system further comprising: an authentication device that performs authentication of the users and/or organizations, wherein the administrative units are authenticated by the authentication device.

As a result, the occurrence of discrepancies in the use status information can be prevented when administrative units comprising users and/or organizations authenticated by the authorization device are excluded.

It is also preferred that the different administrative unit is a public unit that does not require authentication by the authentication device.

As a result, the usage status information for the administrative units comprising users and/or organizations authenticated by the authentication device is added to the usage status information for the 'public', which is an administrative unit not requiring authentication, and thereby discrepancies in the usage status information can be prevented.

It is also preferred that the device is an image forming apparatus and the usage status information is number of times by which image formation was carried out by the image forming apparatus.

As a result, discrepancies in the number of times by which image formation was carried out by the image forming apparatus can be prevented.

From another perspective, the present invention is an administration information change program that is executed by a computer when administrative unit are changed in a administration device that administers usage status information of the device for each administrative unit that is a user and/or a organization, the program comprising the steps of: (a) retrieving from the administration device the usage status information for a plurality of the administrative units currently subjected to administration; (b) designating at least one of the administrative units that are to be excluded as subjects of administration from among the plurality of administrative units retrieved by step (a); and (c) making changes so that the usage status information related to at least one of the administrative units excluding by step (b) is not deleted from the administration device and is treated as a usage status information related to a different administrative unit.

As a result, the process to prevent the occurrence of discrepancies in the usage status information when changes are made to the settings of administrative units subjected to administration by the administration device can be executed by a computer.

It is preferred that the different administrative unit is a prescribed administration unit, and the usage status information related to the administrative unit excluding by step (b) is added to the usage status information related to the prescribed administrative unit.

As a result, because the usage status information for the administrative units to be excluded is added to the usage status information for the prescribed administrative unit, the usage status information for the administrative units to be excluded becomes reflected in the sum, such that the occurrence of discrepancies in the use status information can be prevented.

It is also preferred that the different administrative unit is a public unit that does not require authentication.

As a result, the usage status information for the administrative units to be excluded is added to the usage status information for the 'public', which is an administrative unit not requiring authentication, and thereby the occurrence of discrepancies in the usage status information can be prevented.

From yet another perspective, the present invention is a charge information processing program that is executed by a computer with regard to a device administration system comprising a device, an authentication unit that performs authentication of users and/of organizations in connection with using of the device based on authentication settings information, a first storage unit that stores first charge information in connection with the use by each users and/or organizations, and a second storage unit that stores second charge information in connection with the use by other users who are not users and/or organizations that are subjects of authentication, the program comprising the steps of: (a) retrieving the authentication settings information and the first charge information from the authentication unit and the first storage unit; (b) comparing the retrieved the authentication settings information retrieved by step (a) and the new authentication settings information, (c) editing, based on the results of step (b), the first charge information in connection with use by a user and/or organization to be excluded from authentication as a writing data, and (d) reflecting the writing data to the second charge information stored in the second storage unit or storing the writing data in a file.

According to this program, the writing data based on the new authentication settings is edited by a computer in order to that the first charge information for a user and/or organization to be excluded from authentication will be reflected in the data stored in the second storage unit or stored in a file. Therefore, the charge information is not lost due to the changes made to the authentication settings, and the occurrence of discrepancies in the charge information in the device can be prevented.

Where, in the step (c), in a case where a plurality of users and/or organizations are to be excluded from authentication, the writing data with which the first charge information in connection with use by each users and/or organization to be excluded from authentication was added is edited.

As a result, because when multiple users and/or organizations are to be excluded from authentication, the first charge information for such multiple users and/or organizations is added by the computer to and reflected in the data stored in the second storage unit or stored in a file, it is not necessary for the system to add the first charge information for the users and/or organizations to be excluded from authentication.

From another perspective, the present invention is a charge information processing method executed in a device administration system comprising a device, an authentication unit that performs authentication of users and/of organizations in connection with using of the device based on authentication settings information, a first storage unit that stores first charge information in connection with the use by each users and/or organizations, and a second storage unit that stores second charge information in connection with the use by other users who are not users and/or organizations that are subjects of authentication, the method comprising the steps of: (a) retrieving the authentication settings information and the first charge information from the authentication unit and the first storage unit; (b) comparing the retrieved the authentication settings information retrieved by step (a) and the new authentication settings information, (c) editing, based on the results of step (b), the first charge information in connection with use by a user and/or organization to be excluded from authentication as a writing data, and (d) reflecting the writing data to the second charge information stored in the second storage unit or storing the writing data in a file.

According to this method, the writing data based on the new authentication settings is edited in order to that the first charge information for a user and/or organization to be excluded from authentication will be reflected in the data stored in the second storage unit or stored in a file. Therefore, the charge information is not lost due to the changes made to the authentication settings, and the occurrence of discrepancies in the charge information in the device can be prevented.

It is preferred that if multiple users and/or organizations are to be excluded from authentication, the writing data with which the first charge information in connection with use by each users and/or organization to be excluded from authentication was added is edited.

As a result, because when multiple users and/or organizations are to be excluded from authentication, the first charge information for such multiple users and/or organizations is added to and reflected in the data stored in the second storage unit or stored in a file, it is not necessary for the system to add the first charge information for the users and/or organizations to be excluded from authentication.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 is a table showing one example of counter information; and

DETAILED DESCRIPTION OF THE PREFERRED EMBODIMENTS

An embodiment of the present invention is described below with reference to the drawings.

Figure 1:
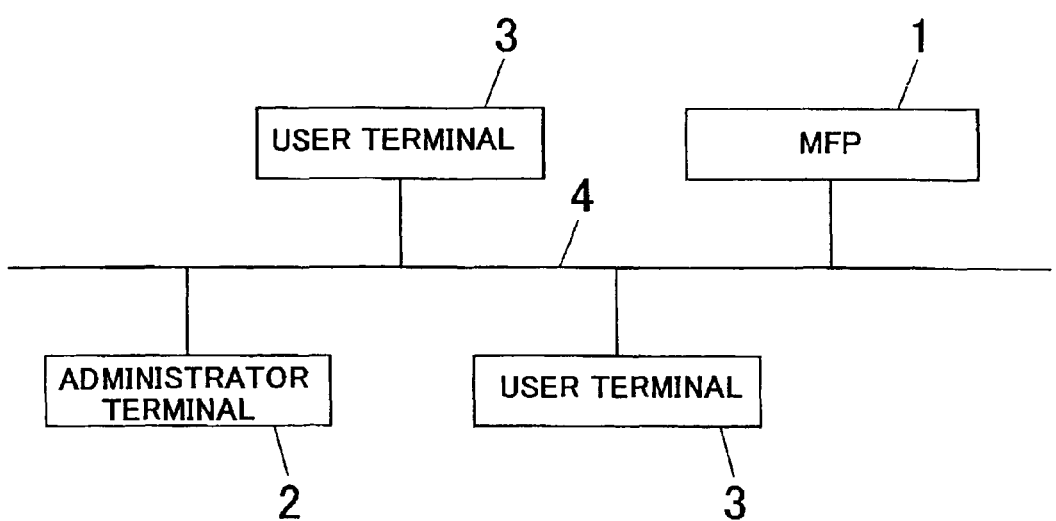
FIG. 1 is a block diagram showing the construction of a network system in which an administrator terminal that executes the charge information processing program comprising an embodiment of the present invention and an MFP comprising the device are mutually connected.

FIG. 1 is a block diagram showing a system in which an MFP 1, which comprises the device, an administrator terminal 2 comprising a personal computer or the like that executes the charge information processing program, which comprises the administration information change program of an embodiment of the present invention, and a user terminal 3 that uses the MFP 1 as a shared printer, are connected over a network 4.

Figure 2:
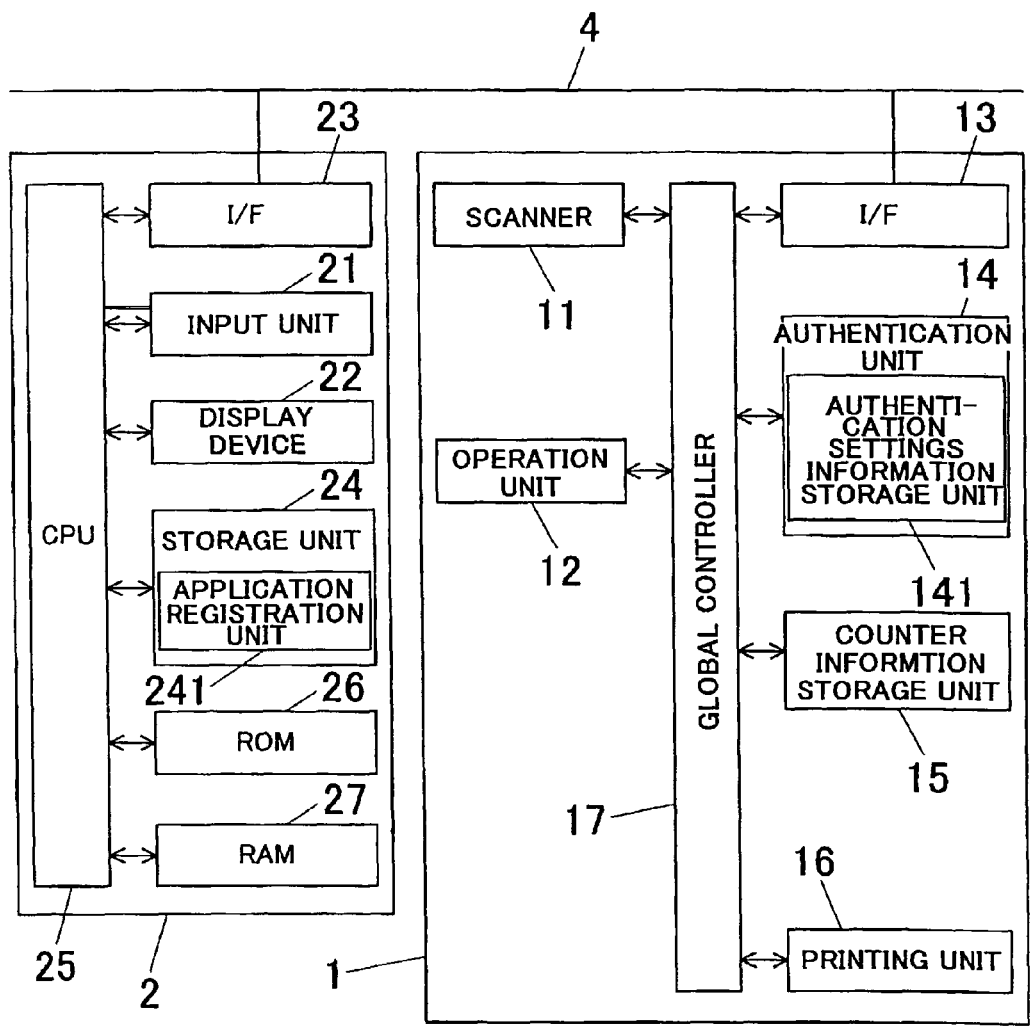
FIG. 2 is a block diagram showing the functions of the internal components of the device and the administrator's terminal shown in FIG. 1.

The MFP 1 has the function of an administration device that administers its own use status, and as shown in FIG. 2, includes a scanner 11, an operation unit 12, an interface (I/F in the drawing) 13, an authentication unit 14, a counter information storage unit 15, a printing unit 16 and a global controller 17.

The scanner 11 scans the original document set by the user and reads the image thereof.

The operation unit 12 is used by the user to input data and/or instructions, and includes various keys such as a display panel enabling input via touching, a start key, a stop key and a numeric key pad.

The interface 13 functions as a transmitter/receiver for communication with the administrator terminal 2 or the user terminal 3.

The authentication unit 14 determines whether or not the entered user ID and password are authorized ones when a user requiring authentication or a user belonging to a department requiring authentication attempts to log in.

A situation in which the authentication unit 14 is included as an internal server of the MFP 1 is shown in connection with this embodiment, but it is also acceptable if a dedicated external authentication server separate from the MFP 1 is connected to the network 4 and authentication is carried out by the external authentication server at the time of use of the MFP 1.

The authentication unit 14 includes an authentication settings information storage unit 141 that stores the current authentication settings information including information regarding the users and/or departments requiring authentication.

The counter information storage unit 15 stores various items of counter information, which comprising charge information, in association with the users and/or departments requiring authentication or public users who do not require authentication, such that such counter information can be updated.

The printing unit 16 outputs onto paper original document data read by the scanner 11 or print data sent from the user terminal 3 or the like.

The global controller 17 performs comprehensive control of the MP 1. For example, it executes user instructions input from the operation unit 12, causes the authentication unit 14 to determine whether or not entered authentication information is authorized information, and causes the printing unit 16 to print original document data read by the scanner 11 or print data.

The global controller 17 also updates prescribed counter information stored in the counter information storage unit 15 each time the MFP 1 is used by a user, retrieves the current authentication settings information stored in the authentication settings information storage unit 141 and the counter information stored in the counter information storage unit 15 in response to instructions from the administrator terminal 2 or the operation unit 12, and sends such information to the administrator terminal 2, as described below. In other words, the global controller 17 also has the function of an administration device that administers the counter information, which indicates the use status of the MFP 1, with regard to administrative units comprising users and departments for which authentication is required and public users ('the public') for whom no authorization requirement is set.

The global controller 17 comprises a computer system including a CPU, a ROM and a RAM.

The administrator terminal 2 functions as an administration information change device that changes the settings regarding the administrative units, and includes an input unit 21, a display device 22, an interface (I/F in the drawing) 23, a storage unit 24, a CPU 25, a ROM 26 and a RAM 27.

The input unit 21 comprises a keyboard and a mouse or the like, and the display device 22 comprises a liquid crystal display device, CRT or other display device.

The interface 23 functions as a transmitter/receiver for communication with the MFP 1 or the user terminal 3.

The storage unit 24 comprises a hard disk, for example, and stores various types of data and programs. In this embodiment, the storage unit 24 includes an application registration unit 241, which stores the charge information processing program that is executed when the authentication settings in the MFP 1 are to be changed.

The CPU 25 performs overall control of the administrator terminal 2 by operating in accordance with a program stored in the ROM 26 or a program registered in the application registration unit 241.

The ROM 26 stores programs and necessary data, and the RAM 27 functions as a work area when the CPU 25 executes a program.

Figure 3:
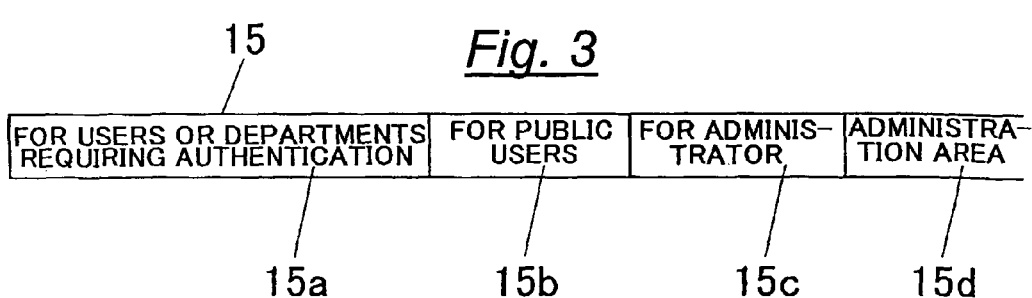
FIG. 3 is a drawing to explain areas in the counter information storage unit.

FIG. 3 is an explanatory drawing that represents the memory areas of the counter information storage unit 15 of the MFP 1.

The memory areas of the counter information storage unit 15 comprise a first area 15a that stores various counter information regarding the use of the MFP 1 by users and/or departments requiring authentication, a second area 15b that stores various counter information regarding the use of the MFP 1 by public users not requiring authentication, a third area 15c that stores the counter information regarding the use of the MFP 1 by the administrator, and an administration area 15d that stores the counter information totals. The data in the first area 15a is lost when the changes are made to the authentication settings, which entails changes to the subjects of authentication, and the data is overwritten by new data that becomes valid under the new settings.

FIG. 4 is a table showing one example of the counter information stored in the first area 15a to the third area 15c of the counter information storage unit 15.

In this embodiment, users requiring authentication are users 1-X, and departments requiring authentication are departments 1-Y. The counters include copy counters (monochrome/full-color/bicolor), large-size copy counters (monochrome/full-color/bicolor), print counters (monochrome/full-color/bicolor), large-size print counters (monochrome/full-color/bicolor), scan counters, large-size scan counters, original document page counters, printing sheet counters and size-specific counters, and each time a user uses the MFP 1, prescribed counter values are added.

The counter information for the users and/or departments requiring authentication shown in FIG. 4 is stored in the first area 15a of the counter information storage unit 15, the counter information for the public users is stored in the second area 15b, and the counter information for the administrator is stored in the third area 15c. The relevant counter information is updated each time the MFP 1 is used by a user. Although not shown in the table of FIG. 4, the total values for each type of counter information are stored in the administration area 15d of the counter information storage unit 15.

The processing executed when the current authentication settings registered in the authentication settings information storage unit 141 of the authentication unit 14 of the MFP 1 is changed will now be explained.

Here, it is assumed that the following types of authentication settings are available in the MFP 1 shown in FIG. 1.

(1) User authentication—The subjects of authentication are users (authentication by the device's internal server)

(2) User authentication—The subjects of authentication are users (authentication by an external server)

(3) Department authentication—The subjects of authentication are departments (authentication using a name and password)

(4) Department authentication—The subjects of authentication are departments (authentication using only a password)

(5) User/department authentication—The subjects of authentication are users and departments (authentication by the device's internal server)

(6) User/department authentication—The subjects of authentication are users and departments (authentication by an external server)

Where one of the above six types of authentication settings is used in the MFP 1, a user or department that is currently a subject of authentication may be removed from administration when a user resigns from a company, when a department is abolished, or when the authorization settings configuration is changed.

For example, where the settings configuration is changed from user authentication ((1) or (2)) to department authentication ((3) or (4)), or from user/department authentication ((5) or (6)) to department authentication ((3) or (4)), the users who are currently the subjects of authentication become excluded.

Where the settings configuration is changed from department authentication ((3) or (4)) to user authentication ((1) or (2)) or from user/department authentication ((5) or (6)) to user authentication ((1) or (2)), the departments that are currently the subjects of authentication become excluded.

Furthermore, where the settings configuration is such that both users and departments are subjected to authentication, if the assignment ratio is changed, some of the current users or departments may become excluded.

For example, where the number of subjects of authentication that can be stored in the first area 15a of the counter information storage unit 15 is 1,000, of which 800 are assigned to users and 200 to departments, if the assignment ratio is to be changed to 900 users and 100 departments, 100 departments will become excluded from among the departments that are subject to authentication according to the current settings. Conversely, where the assignment ratio is to be changed to 700 users and 300 departments, 100 users will become excluded from among the users that are subject to authentication according to the current settings.

Where new authentication settings that entail the exclusion of some of the users and/or departments currently subjected to authentication are configured, the counter information for such users and/or departments that is stored in the first area 15a of the counter information storage unit 15 becomes lost due to overwriting. As a result, for example, discrepancies occur between the new counter information and the counter totals stored in the administration area 15d of the counter information storage unit 15.

Therefore, in this embodiment, when the authentication settings are to be changed from the administrator terminal 2, the following processing takes place.

Figure 5:
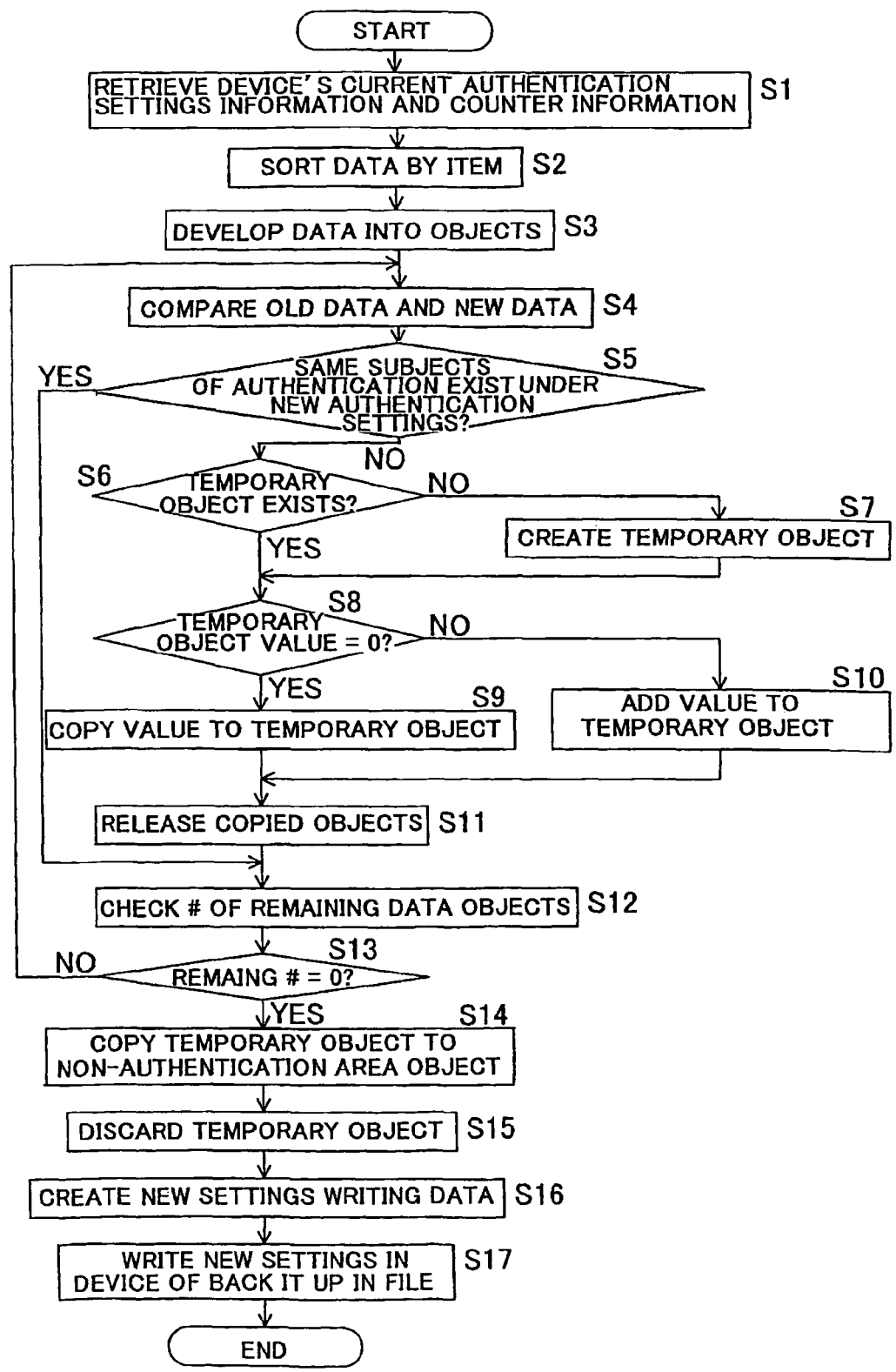
FIG. 5 is a flow chart showing the sequence of operations executed according to the charge information processing program.

FIG. 5 is a flow chart showing the operations executed by the CPU 25 of the administrator terminal 2 when the authentication settings are to be changed. This processing is carried out by the CPU 25 of the administrator terminal 2 executing a program registered in the application registration unit 241, as described above.

In the description provided below and the drawing, 'step' is abbreviated as 'S'.

In S1, the CPU 25 retrieves the current authentication settings information regarding the MFP 1 as well as the counter information for the users and/or departments subjected to authentication. These items of information do not need to comprise the entirety of the authentication settings information, but may comprise a part thereof depending on the nature of the changes to be made to the authentication settings.

When the CPU 25 sends a transmission request signal to the MFP 1, the MFP 1 retrieves the authentication settings information stored in the authentication settings information storage unit 141 and the counter information stored in the first area 15a of the counter information storage unit 15, and sends these items of information to the CPU 25, enabling the CPU 25 to retrieve the information.

In S2, the CPU 25 sorts the retrieved information by description, and in S3, develops the data into objects (sets of related data).

The administrator configures new authentication settings by using and editing the retrieved information on the screen of the display device 22 of the administrator terminal 2.

In S4, the CPU 25 compares the old settings (i.e., the current settings) and the new settings, and in S5, determines for each object whether or not the subjects of authentication under the old settings are included as subjects of authentication under the new settings.

Where the subjects of authentication under the old settings are determined to be included as subjects of authentication under the new settings with regard to the first object (YES in S5), the counter information under the old settings can be brought forward unchanged as the counter information under the new settings. The CPU 25 therefore proceeds to S12.

Where it is determined that the subjects of authentication under the old settings will not be included as the subjects of authentication under the new settings (NO in S5), the counter information for such subjects of authentication will be deleted. In S6, the CPU 25 therefore determines whether or not a temporary object exists.

If a temporary object exists (YES in S6), the CPU 25 advances to S8. If it does not (NO in S6), the CPU 25 creates a temporary object in S7 and proceeds to S8.

In S8, the CPU 25 determines whether or not the counter value for the temporary object is '0', and if it is '0' (YES in S8), the CPU 25 copies to the temporary object the counter values for the subjects of authentication to be excluded in S9, and proceeds to S11. If the counter value for the temporary object is not '0' (NO in S8), the CPU 25 adds that counter value and the counter values for the subjects of authentication now to be excluded in S10, and proceeds to S11. The copying or addition of counter values is carried out for each type of counter.

After releasing the objects for which counter value copying or adding was carried out in S11, the CPU 25 checks the number of remaining objects for comparison between the new and old settings in S12, and determines in S13 whether or not such number is '0'.

If the number of remaining objects is not '0' (NO in S13), the CPU 25 returns to S4 and repeats the operations of S4-S13 with regard to the next object.

If the number of remaining objects is '0' in S13 (YES in S13), because that means that comparison was made regarding all objects, the CPU 25 copies the temporary object to the non-authorization area object in S14. The counter value for the temporary object is the total of the counter values for the users and/or departments that are subjects of authorization under the current settings but will be excluded under the new settings, and this value is copied in connection with the non-authorization area object.

In S15, the temporary object is discarded, and in S16, writing data for the new authentication settings is created. The non-authorization object becomes the writing data for the second area 15b of the counter information storage unit 15 in which public user counter information is stored, and based on this data, the total of the users and/or departments to be excluded under the new authorization settings are reflected in the second area. In this embodiment, the counter value for the temporary object is added to the current counter value for the non-authorization area object (the public). Therefore, the risk of losing the counter information for the users and/or departments excluded under the new settings is eliminated.

In S17, the edited writing data is written in the MFP 1 or backed up in the form of a file, whereupon processing ends.

Where the writing data is written in the MFP 1, the new authentication settings information is stored in the authorization settings information storage unit 141 of the authorization unit 14, the counter information for the users and/or departments that became the subjects of authorization under the new authorization settings is stored in the first area 15a of the counter information storage unit 15, and the counter information for the users and/or departments that are the administrative units excluded under the new authorization settings becomes reflected in the data stored in the second area 15b (i.e., the stored data for the public administrative unit). As a result, the problematic occurrence of a discrepancy in the counter total in the MFP can be prevented.

In this embodiment, the counter values for the users and/or departments to be excluded are added to the current public user counter value to create a new counter value in order to reflect the counter information for such users and/or departments in the data stored in the second area 15b, but it is also acceptable if such counter information is stored in the second area 15b separate from the public user counter value.

The writing data backed up to a file is written by the administrator terminal 2 in the MFP 1 at a chosen time.

An embodiment of the present invention was described above, but the present invention is not limited thereto. For example, the charge information processing program was executed by the administrator terminal 2 in the above embodiment, but it is also acceptable if the charge information processing program is installed in the MFP 1 itself and the administrator executes the program by operating the operation unit 12. In this case, the administration information change device is also included in the MFP 1.

In addition, as mentioned above, an external authentication server may be used separate from the MFP 1, and the counter information storage unit 15 is included in an external database server separate from the MFP 1.

Furthermore, the counter information for the users and/or departments excluded under new authentication settings was reflected in the second area 15b of the counter information storage unit 15 in which the public user counter information is stored, but it is also acceptable if such counter information is instead reflected in the third area 15c in which the administrator's counter information is stored. It is also acceptable if virtual users and/or departments are created for the excluded users and/or departments in the first area 15a such that their counter information is reflected therein. In this case, the administrator can check the counter values for the excluded users and/or departments by carrying out authentication of the virtual users and/or departments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed:

1. A device administration system comprising:
a device;
an administration device that administers usage status information of the device for each of a plurality of administrative units including a plurality of first administrative units that are corresponding to a user and/or an organization and a common second administrative unit that is not corresponding to a user and/or an organization of the first administrative units; and
an administration information change device that is operable to change settings of each first administrative unit to exclude one or more of the first administrative units from among the plurality of first administrative units;
wherein in a case where the administration information change device excludes one of the first administrative units from among the plurality of first administrative units, the administration information change device automatically adds the usage status information of the excluded administrative unit to the usage status information of the second administrative unit; and
wherein the device includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the administration information change device automatically adds the usage status information from the first storage area to the second storage area.

2. The device administration system according to claim 1, further comprising:
an authentication device that performs authentication of a user and/or organization,
wherein the plurality of first administrative units are authenticated by the authentication device.

3. The device administration system according to claim 2, wherein the second administrative unit is a public unit that does not require authentication by the authentication device.

4. The device administration system according to claim 1, wherein the device is an image forming apparatus and the usage status information is a number of times by which image formation was carried out by the image forming apparatus.

5. A non-transitory computer readable recording medium storing an administration information change program thereon, the program executed by a computer when settings of a first administrative unit from among a plurality of administrative units including first administrative units and a common second administrative unit is changed in an administration device that administers usage status information of a device for each administrative unit, each first administrative unit being a user and/or an organization and the second administrative unit not being a user and/or an organization of the first administrative units, the program causing the computer to execute operations comprising:
(a) retrieving from the administration device the usage status information for each of the first administrative units currently subjected to administration;
(b) designating at least one of the first administrative units to be excluded as a subject of administration from among the plurality of first administrative units retrieved by step (a); and
(c) automatically adding the usage status information of the at least one first administrative unit excluded by step (b) to the usage status information of the second administrative unit;
wherein the device includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the program causes the computer to automatically adds the usage status information from the first storage area to the second storage area.

6. The non-transitory computer readable recording medium according to claim 5, wherein the second administrative unit is a public unit that does not require authentication.

7. The non-transitory computer readable recording medium according to claim 5, wherein
the first storage area stores first charge information in connection with use by each of the first administrative units that is a subject of authentication as the usage status information of the first administrative units, and the second storage area stores second charge information in connection with use by a second administrative unit not being a user and/or an organization that is a subject of authentication as the usage status information of the common second administrative unit, and
as a result of comparing authentication settings information for users or organizations in connection with using the device and new authentication settings information thereof, when one of the first administrative units is excluded from among the plurality of first administrative units, the program causes the computer to automatically add the first charge information of the excluded first administrative unit from the first storage area to the second storage area.

8. An image processing apparatus having at least one function for processing an image, comprising:
an image processing device;
an administration device that administers usage status information of the image processing device for each of a plurality of administrative units including a plurality of first administrative units that correspond to a user and/or an organization and a common second administrative unit that is not corresponding to a user and/or an organization of the first administrative units; and
an administration information change device that is operable to change settings of each first administrative unit to exclude one or more of the first administrative units from among the plurality of first administrative units;
wherein in a case where the administration information change device excludes one of the first administrative units from among the plurality of first administrative units, the administration information change device automatically adds the usage status information of the excluded administrative unit to the usage status information of the second administrative unit;
wherein the image processing device includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the administration information change device automatically adds the usage status information from the first storage area to the second storage area.

9. A device administration system comprising:
a device;
an external database server;
an administration device that administers usage status information of the device for each of a plurality of administrative units including a plurality of first administrative units that are corresponding to a user and/or an organization and a common second administrative unit that is not corresponding to a user and/or an organization of the first administrative units; and
an administration information change device that is operable to change settings of each first administrative unit to exclude one or more of the first administrative units from among the plurality of first administrative units;
wherein in a case where the administration information change device excludes one of the first administrative units from among the plurality of first administrative units, the administration information change device automatically adds the usage status information of the excluded administrative unit to the usage status information of the second administrative unit; and
wherein the external database server includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the administration information change device automatically adds the usage status information from the first storage area to the second storage area.

10. A non-transitory computer readable recording medium storing an administration information change program thereon, the program executed by a computer when settings of a first administrative unit from among a plurality of administrative units including first administrative units and a common second administrative unit is changed in an administration device that administers usage status information of a device for each administrative unit, each first administrative unit being a user and/or an organization and the second administrative unit not being a user and/or an organization of the first administrative units, and the device operable to communicate with an external database server, and the program causing the computer to execute operations comprising:

(a) retrieving from the administration device the usage status information for each of the first administrative units currently subjected to administration;

(b) designating at least one of the first administrative units to be excluded as a subject of administration from among the plurality of first administrative units retrieved by step (a); and (c) automatically adding the usage status information of the at least one first administrative unit excluded by step (b) to the usage status information of the second administrative unit;

wherein the external database server includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the program causes the computer to automatically adds the usage status information from the first storage area to the second storage area.

11. An image processing apparatus adapted to communicate with an external database server, and having at least one function for processing an image, comprising:

an image processing device;

an administration device that administers usage status information of the image processing device for each of a plurality of administrative units including a plurality of first administrative units that correspond to a user and/or an organization and a common second administrative unit that is not corresponding to a user and/or an organization of the first administrative units; and an administration information change device that is operable to change settings of each first administrative unit to exclude one or more of the first administrative units from among the plurality of first administrative units;

wherein in a case where the administration information change device excludes one of the first administrative units from among the plurality of first administrative units, the administration information change device automatically adds the usage status information of the excluded administrative unit to the usage status information of the second administrative unit;

wherein the external database server includes a storage unit comprising a first storage area storing usage status information of the first administrative units corresponding to a user and/or an organization, and a second storage area storing usage status information of the common second administrative unit not corresponding to a user and/or an organization of the first administrative units, and when one of the first administrative units is excluded from among the plurality of first administrative units, the administration information change device automatically adds the usage status information from the first storage area to the second storage area.

* * * * *